United States Patent [19]

McCann et al.

[11] Patent Number: 5,033,646

[45] Date of Patent: Jul. 23, 1991

[54] LIQUID DISPENSING SYSTEM INCLUDING AIR EVACUATING APPARATUS

[75] Inventors: Gerald P. McCann, Los Angeles; Donald Verley, Lake Elizabeth, both of Calif.

[73] Assignee: McCann's Engineering and Manufacturing Co., Los Angeles, Calif.

[21] Appl. No.: 510,204

[22] Filed: Apr. 17, 1990

[51] Int. Cl.[5] .......................... B67D 5/08; F16K 24/00
[52] U.S. Cl. .................................... 222/69; 222/129.1; 137/202
[58] Field of Search ...................... 222/67, 69, 105, 94, 222/129.1–129.4, 56, 57; 137/202

[56] References Cited

U.S. PATENT DOCUMENTS

| | | | |
|---|---|---|---|
| 2,565,045 | 8/1951 | Ray | 222/69 X |
| 3,054,419 | 9/1962 | Farrell | 137/202 |
| 3,057,518 | 10/1962 | Japp | 222/69 |
| 3,112,844 | 12/1963 | Keller et al. | 222/69 X |
| 3,324,874 | 6/1967 | Armstrong et al. | 137/202 |
| 3,340,887 | 9/1967 | Peters | 137/202 |
| 4,356,937 | 11/1982 | Simon et al. | 222/129.2 |
| 4,730,638 | 3/1988 | Hazelton | 137/202 |
| 4,938,387 | 7/1990 | Kervefors et al. | 222/129.4 |

Primary Examiner—Michael S. Huppert
Assistant Examiner—Kenneth R. DeRosa
Attorney, Agent, or Firm—Lyon & Lyon

[57] ABSTRACT

A liquid dispensing system including an air evacuating apparatus is disclosed. The liquid dispensing system includes a dispensing mechanism and an air evacuating apparatus. The air evacuating apparatus includes a primary pump, a reservoir, an inlet in the reservoir operative to introduce liquid into the reservoir, an outlet in the reservoir operative to transport liquid from the reservoir to the primary pump, a level sensor operative to ascertain the level of liquid in the reservoir, an auxiliary pump, and a controller responsive to output from the level sensor to selectively control operation of the auxiliary pump to remove gas from the reservoir. The primary pump is operative to transport a dispensable liquid from a storage container to the dispensing mechanism.

18 Claims, 3 Drawing Sheets

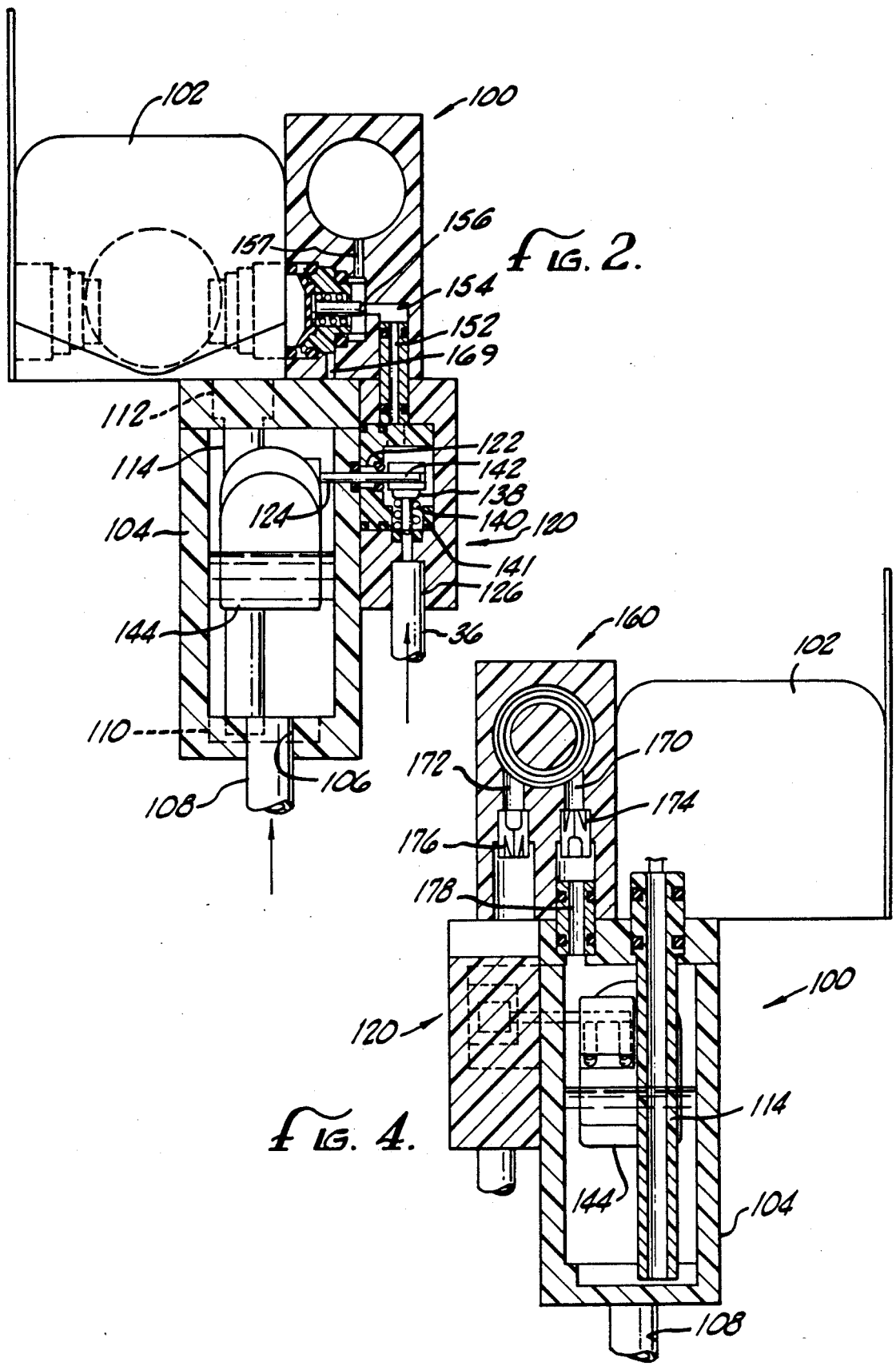

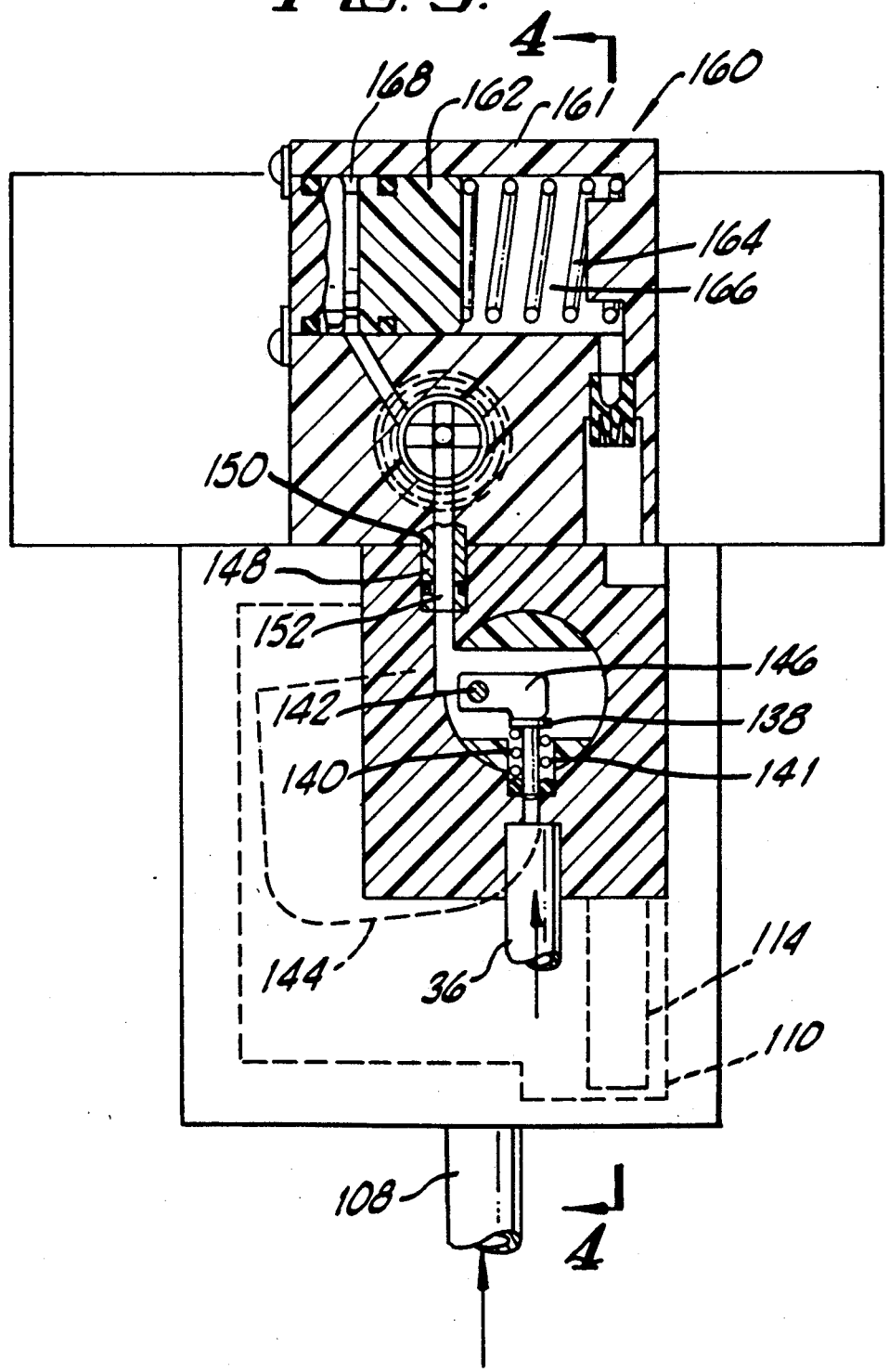

LIQUID DISPENSING SYSTEM INCLUDING AIR EVACUATING APPARATUS

FIELD OF THE INVENTION

This invention relates to liquid dispensing systems and, in particular, those that employ a gas evacuating apparatus which is useful to remove unwanted gas, normally air, from a supply line to prevent the gas from being inadvertently dispensed by the liquid dispensing system.

BACKGROUND OF THE INVENTION

Liquid dispensing systems are commonly used for numerous purposes, the most prevalent of which involves vending machine or soft drink dispensing applications. Normally, the liquid dispensing system includes a plurality of bag-in-box storage containers, wherein a liquid such as flavored syrup, commonly one of a number of flavors, is stored for later use within a rigid box. The syrup is normally stored in a flexible bag located within the rigid box; the bag adapted to collapse as the syrup is used. These types of storage containers have been found to be particularly useful for soft drink dispensing applications, because of the ease of storing the rigid boxes and the ease with which the flexible bags can be refilled for additional use. It is known that in the process of filling the bag contained within the rigid box a volume of unwanted air, or another gas, is often introduced into the bag and is inadvertently stored in the bag along with the syrup.

Normally, when the bag-in-box storage container is attached to the remaining components of the liquid dispensing system, the unwanted air contained in the bag will be introduced into a supply line and eventually caused to pass through a pump into a dispensing tower. This unwanted air in the syrup supply line creates numerous problems. The foremost of these problems is that air in the syrup supply line will meet with carbonated water, which is introduced into the liquid dispensing tower from a carbonated water supply line, and the rapid decrease in partial pressure of the carbon dioxide in the carbonated water will cause excessive foaming of the dispensed soft drink. This excessive foaming is highly undesirable and results in numerous problems. In addition, air in the syrup supply line will also cause intermittant operation, more commonly known as "burping", with the attendant splashing of the dispensing liquid.

Excessive foaming of the dispensed soft drink requires that the operator of the liquid dispensing system terminate the filling cycle substantially before the soft drink container is completely filled. This requires that the operator re-initiate the filling cycle, possibly a number of times, to "top off" the drink. In addition, excessive foaming also causes expensive spillage of the dispensed soft drink, which causes unnecessary waste problems and creates a generally unsanitary condition of the work station with possible appearance problems.

Recognizing the undesirable results occassioned by the presence of unwanted air introduced in the syrup supply line, the industry has responded to this problem by placing a reservoir along the length of the syrup supply line and providing a bleed valve in the reservoir, whereby a certain amount of syrup is introduced into the reservoir and accumulates in the bottom of the reservoir with the result being that any air existing in the syrup supply line prior to the reservoir is collected in the upper portion of the reservoir and then removed from the reservoir by selective operation of the bleed valve.

Although these types of systems have been shown to be successful in certain applications, these particular types of systems have additional disadvantages. For example, the bleed valve may require operator attendance or a back-up system to relieve the air that has accumulated within the reservoir.

In another commercial device, a reservoir is positioned along the high pressure side of the syrup supply line, i.e. after the pump. The reservoir has an inlet and an outlet and includes a float. The float operates to automatically open a bleed valve as it falls in the reservoir; the result being that any excess air accumulated in the reservoir is evacuated. The primary disadvantage of this system was that the reservoir was on the high pressure side of the pump, which caused possible spillage if the float failed to operate. This reservoir construction was also ineffective at removing substantially all small bubbles located in the syrup.

In addition, for high-speed dispensing applications, wherein the soft drink is being dispensed at flow rates far in excess of those previously achievable, it has been found that the use of a reservoir and bleed valve system is insufficient to prevent air from being drawn into the syrup supply line after the reservoir and pumped with the syrup to the dispensing tower.

Thus, it is desirable that an automatic air evacuation apparatus be employed to collect air that is contained in the syrup supply line extending from the bag-in-box supply system and automatically evacuate that air, so as to prevent its passage into and through the primary syrup pump and eventually to the dispensing tower.

OBJECT AND SUMMARY OF THE PRESENT INVENTION

It is the general object of the present invention to provide a new and improved liquid dispensing system which includes an automatic air, or gas, evacuation apparatus that operates without operator attendance to remove unwanted air, or gas, contained in a liquid supply line.

Another object of the present invention is to provide an air, or gas, evacuating apparatus useable with a soft drink dispensing system, which is operable to dispense liquid at flow rates substantially in excess of those previously in existence, wherein the air, or gas, evacuation apparatus is operable to remove unwanted air, or gas, in the syrup supply line and thus reduce the possibility of excessive foaming of the dispensed soft drink.

It is another object of the present invention to provide an air, or gas, evacuating apparatus for use with a liquid dispensing system, which includes an auxiliary pump that is operable with a primary pump and is selectively controlled through the use of a controller, the auxiliary pump being adapted to evacuate unwanted air, or gas, contained in a liquid supply line.

It is another object of the present invention to provide an air, or gas, evacuating apparatus for use with a liquid dispensing system which includes a level sensor contained within a reservoir which is operative to sense the level of liquid in a reservoir and thereby actuate a controller which is operative to start and stop an auxiliary pump for the purpose of evacuating unwanted air, or gas, in a liquid supply line.

The liquid dispensing system, including an air, or gas, evacuating apparatus, of the present invention includes, in summary, a dispensing mechanism, a supply system, a primary pump, a reservoir, an inlet in said reservoir operative to introduce liquid into said reservoir, an outlet in said reservoir operative to transport liquid from said reservoir to said primary pump, a level sensor operative to ascertain the level of liquid in said reservoir, an auxiliary pump, and a controller responsive to output from said level sensor to selectively control operation of said auxiliary pump to remove gas from said reservoir. In the liquid dispensing system of the present invention the dispensing mechanism receives the dispensed liquid from the primary pump, which operates to transport the liquid to be dispensed from a storage system to the dispensing mechanism through the air, or gas, evacuating apparatus.

The foregoing and additional objects and features of the present invention will become apparent from the following description, in which the preferred embodiment has been set forth in detail, in conjunction with the accompanying drawings.

BRIEF DESCRIPTIONS OF THE DRAWINGS

FIG. 2 is a front cross-sectional view of the air, or gas, evacuating system of the present invention.

FIG. 3 is a side cross-sectional view of the air, or gas, evacuating apparatus of the present invention.

FIG. 4 is a back cross-sectional view of the air, or gas, evacuating apparatus of the present invention along the line 4—4 in FIG. 3.

DESCRIPTION OF THE PREFERRED EMBODIMENT

Figure 1:
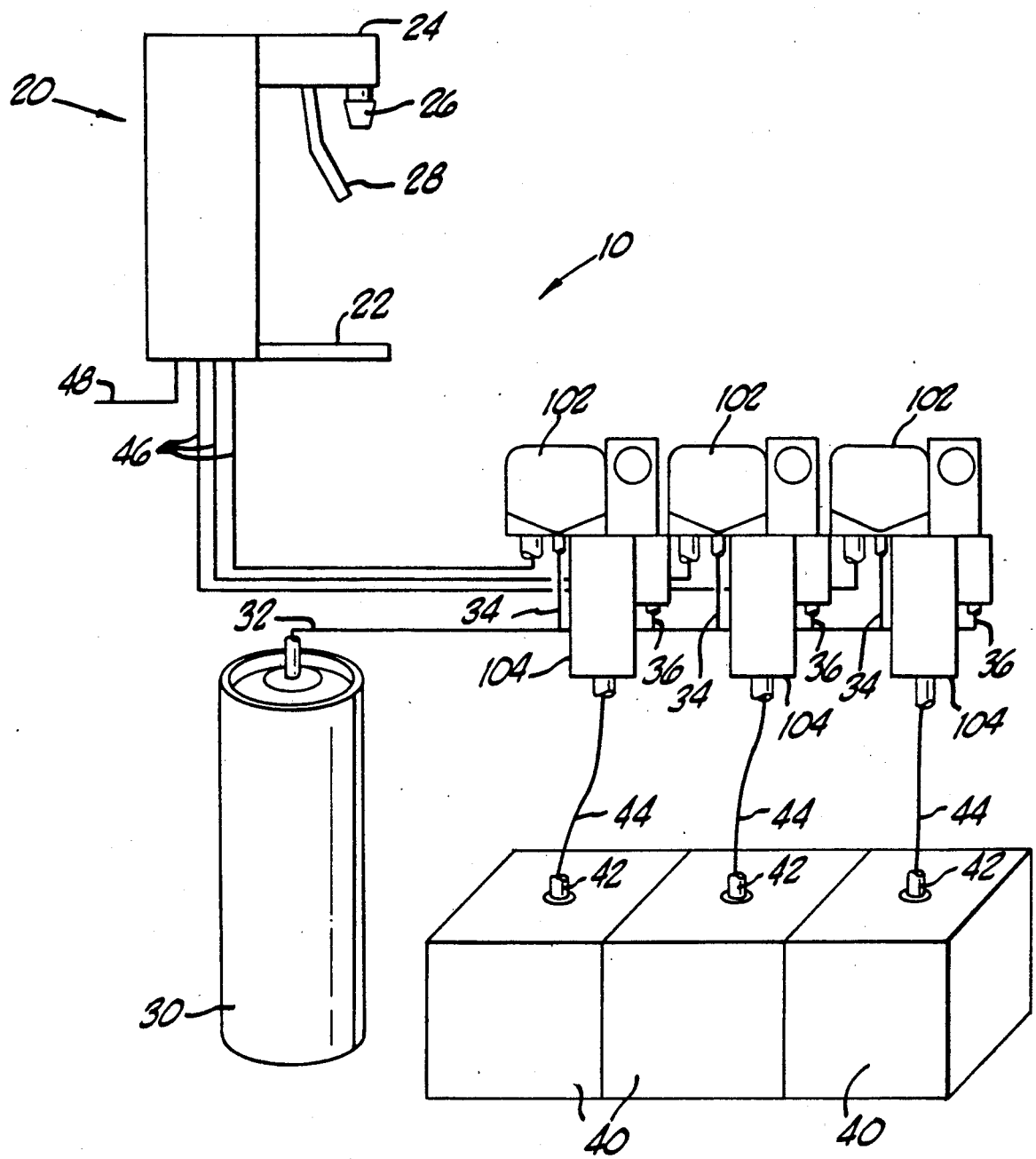
FIG. 1 is a drawing of a liquid dispensing system which includes a dispensing tower, a plurality of bag-in-box storage systems, a compressed air supply, and the air, or gas, evacuating apparatus constructed in accordance with the present invention.

Referring to the drawings, a liquid dispensing system, including an air, or gas, evacuating apparatus, constructed in accordance with the present invention is shown in perspective in FIG. 1, and is designated with the numeral 10.

The liquid dispensing system 10 includes a dispensing tower, generally designated with the numeral 20, which includes a stand 22, a dispensing control section 24 and a nozzle 26 extending downward from the control section 24. A movable lever 28 is rotatably attached to the control section 24 and is operative to initiate the filling cycle at the will of the operator. The general construction of the control section, including the operation of the valves and solenoids, has been described previously U.S. Pat. No. 4,712,591 to McCann, et al, which is incorporated herein by reference as though fully set forth herein, and in other references cited therein. Also, the nozzle in the preferred embodiment is a nozzle capable of high speed dispensing and is described in great detail in U.S. Pat. No. 4,928,854.

The liquid dispensing system 10 also includes a source of compressed air 30 which has a main supply line 32 that is separable into a plurality of primary pump supply lines 34 and controller supply lines 36. The source of compressed air 30 may take various forms but commonly it consists of a compressed air cylinder manually adjustable to operate at various air supply pressures depending upon other operating characteristics of the liquid dispensing system 10, including the desired liquid dispensing rate.

Also included are a plurality of bag-in-box storage containers 40 which are of the common variety wherein a rigid box, often made of cardboard, is provided with a fleXible bag (not shown) included within the box of the storage container 40, wherein the flexible bag has a supply tube 42 extending from an upper surface of the storage container 40 to facilitate removal of the liquid stored within the flexible bag. The supply tubes 42 may be provided with clamps or plugs to prevent leakage while being stored or otherwise not in use. A plurality of syrup supply lines 44 are connected to the supply tubes 42 and operate to transport the liquid stored within the storage containers 40 to the remaining elements of the liquid dispensing system 10. A plurality of dispensing tower supply lines 46 extend into the dispensing tower 20 from the primary pumps, which hereinafter be designated separately and discussed in greater detail. A source of carbonated water 48 is shown in the preferred embodiment which contemplated the use of the liquid dispensing system 10 of the present invention in a soft drink dispensing application. However, it should be appreciated that the liquid dispensing system 10 of the present invention may be used in a wide variety of applications.

The present preferred embodiment also contemplates the use of an air evacuating apparatus with a liquid dispensing system 10 used to dispense carbonated liquids, such as soft drinks, for numerous high volume purposes including restaurants, amusement parks and other public locations. However, the present invention is usable with lower volume installations, including home or office use. Moreover, the liquid dispensing system 10 of the present invention is shown with only three storage containers 40, but it should be appreciated that additional storage containers may be employed, as long as, an associated air evacuation apparatus is employed. A detailed description of the air evacuating apparatus of the present invention will be discussed in greater detail with reference to FIGS. 2, 3 and 4. In addition, the use of the term "air" when designating the "gas" in the supply system is also meant to refer to other gases that may be in the supply system.

A front cross-sectional view of the air evacuating apparatus of the present invention, and generally designated with the numeral 100, is shown in FIG. 2. The air evacuating apparatus 100 includes a primary pump 102 which is of the reciprocating variety and is of the construction disclosed in U.S. Letters Pat. No. 4,386,888, to Verley, now being manufactured and sold by McCann's Engineering, Los Angeles, Calif. The reciprocating pump 102 is operated by compressed air supplied by the source 30 and is useful to provide a continuous flow of liquid, in this particular case syrup, for dispensing by the liquid dispensing system 10.

Attached to a lower portion of the reciprocating pump 102 is a reservoir 104 which in the preferred embodiment is generally rectangular in construction, however, may be constructed in numerous other shapes or designs. The reservoir 104 has a syrup inlet aperture 106 which is adapted to receive a syrup supply line 108, which is either the same as the supply line 44 or represents a later extension of the supply line 44. A suitable locking mechanism (not shown) is provided to maintain the line 108 within the aperture 106.

The reservoir 104 further includes a depressed cavity 110, which results in an additional pool of dispensed liquid, in this case syrup, residing at a level lower than the entry level from the supply line 108 into the reservoir 104. The reservoir 104 has an upper aperture 112 into which is receivable a primary pump supply line 114 which extends throughout the reservoir 104 with its opening located within the depressed cavity 110, the supply line 114 being operative to transport liquid, such as syrup, from the reservoir 104 to an inlet in the primary pump 102 where the dispensed liquid, such as syrup, is then transported by the primary pump 102 through the supply lines 46, shown in FIG. 1, to the dispensing tower 20. The cavity 110 is useful to provide a priming volume in the reservoir 104 and assists in reducing the possibility of any air in the line 114.

Attached to one side of the reservoir 104 is a controller, generally designated with the numeral 120, which has an aperture 122 defined along its side which is coaxial with an aperture 124 defined in the side of the reservoir 104. The controller 120 includes along its bottom surface a controller supply aperture 126 into which is receivable the compressed air supply line 36. Again, a suitable locking mechanism (not shown) is provided to maintain the line 36 in the aperture 126.

A valve 138, generally T-shaped in configuration, is positioned within the controller 120 and is biased in an upward direction by the action of a spring 140 which is located in a recessed channel 141 in the controller 120. A rod 142 extends from inside the controller 120 to inside the reservoir 104. The rod 142 is received into and rigidly attached to a float 144, which is contained within the interior of the reservoir 104. The rod 142 is attached to the float 144 in an off-center location, as better shown in FIG. 3, so that rotation of the float 144, occasioned by a rising of the level of liquid contained within the reservoir 104, will occasion clockwise rotation of the float 144 to rotate the rod 142.

A side cross-sectional view of the controller 120 is shown in more detail in FIG. 3. The controller 120 further includes an arm 146 which has the rod 142 rigidly attached thereto, whereby rotation of the rod 142 will occasion rotation of the arm 146 to operate upon the valve 138. Downward movement of the distal portion of the arm 146 will cause downward movement of the top of the valve 138 against the force of the spring 140. As the valve 138 moves downward, it will eventually seal the inside of the controller 120 from entry of compressed air through the tube 36. A channel 148 is contained within the controller 120 and receives a tube 150 which has a passage 152 located within it. The passage 152 provides for transportation of compressed air when the valve 138 is in the upper position through the controller 120 and into an auxiliary pump, generally designated with the numeral 160.

The auxiliary pump 160 includes a reciprocating piston 162 which is biased in one direction by the force of a spring 164 contained within a chamber 166 located within the body 161 of the auxiliary pump 160. As shown in FIG. 2, the passage 152 opens into a chamber 154 within the auxiliary pump 160 and operates to transfer the compressed air to a valve 156 which is used to actuate operation of the auxiliary pump 160.

As shown in FIG. 3, a chamber 168 is located on one side of the piston 162 and receives compressed air from the chamber 154 and line 157 in sychronization with the cycle of the primary pump 102 when the valve 138 is positioned to permit entry of compressed air into and through the controller 120. A vent 169 is also used with the chamber 168 to expel air in the chamber 168 and thus facilitate the pumping action.

A cross-section of the air evacuating apparatus 100 of the present invention along the line 4—4 of FIG. 3 is shown in FIG. 4. The auxiliary pump 160 is shown with an auxiliary pump inlet channel 170 and an outlet channel 172. An inlet channel check valve 174 and an outlet channel check valve 176 are contained within the respective channels. The inlet channel 170 is in fluid communication with the interior of the reservoir 104 whereby air contained within the upper portion of the reservoir 104 will pass through a passage 178, through the check valve 174, through the channel 170 and into the pumping chamber 166, shown in FIG. 3. As the pumping chamber 166, shown in FIG. 3, changes in volume due to operation with the primary pump 102, the air that is located within the chamber 166 is forced through the channel 172 and through the check valve 176 to the atmosphere. Thus, the auxiliary pump 160 operates to evacuate any gas located within the upper portion of the reservoir 104. Check valves 174 and 176 are provided to assure one-way flow and prevent any air from passing through the pumping chamber 166 back into the reservoir 104.

The operation of the liquid dispensing system 10, which includes an air evacuating apparatus, of the present invention will now be described. Upon rotation of the lever 28, which is pivotably attached with the dispensing tower 20, carbonated water and syrup, then mixed, begin to be dispensed by the nozzle 26. The syrup is supplied to the dispensing tower 20 by the syrup supply lines 46 which extend from the primary pumps 102. In the normal case, a plurality of primary pumps 102 are provided to transport multiple flavored syrups. The primary pumps 102 are operated by air supplied through the primary pump supply lines 34 through the compressed gas supply line 32 from the compressed gas source 30. Syrup within the storage containers 40 passes through the supply tubes 42 into the syrup supply lines 44 and into the reservoirs 104.

Referring to FIGS. 2, 3 and 4, once the syrup has passed into the reservoir 104, it begins to collect in the bottom of the reservoir 104 and upon reaching a certain level will cause movement of the float 144 in an upward direction. As the float 144 moves in an upward direction, it causes rotation of the rod 142 which passes into the controller 120. As the rod 142 rotates it causes downward movement of the arm 146 to push the valve 138 against the resistance of the spring 140 closing the channel 141 and thereby terminating introduction of compressed 36 into the controller 120.

If a volume of air is introduced into the supply lines 44, that air will pass into the reservoir 104 and fill the upper portion of the reservoir 104 thereby causing the float 144 to rotate counter-clockwise, thereby rotating the rod 142 in the counter-clockwise direction, which will cause the arm 146 to rotate in a counter-clockwise direction thus permitting the valve 138 to move upward under the action of the spring 140. When this occurs, the compressed gas moving through the tube 36 moves through the channel 152 and fills the chamber 168 alternately when the valve 156 moves in synchronization with the control system of the reciprocating primary pump 102.

When this occurs, the chamber 168 is alternately filled by the line 157 and emptied by the vent 169 thereby causing reciprocating movement of the reciprocating piston 162 against and with the action of the spring 164 to increase and decrease the size of the cavity 166. As the cavity 166 is increased and decreased in size, air in the upper portion of the reservoir 104 passes through the channel 178 through the check valve 174 and into the channel 170. The air enters the cavity 166 and upon reduction in the size of the cavity 166 the air within the cavity 166 will pass through the channel 172 through the check valve 176 and out of the auxiliary pump 160. Thus, operation of the auxiliary pump 160 will cause the upper portion of the reservoir 104 to be evacuated of air and the level of fluid, in this case syrup, will rise within the reservoir 104.

As the fluid, in this case syrup, rises within the reservoir 104, the float 144 will rotate in the clockwise direction thereby rotating the rod 142 in the clockwise direction to rotate the arm 146 in the clockwise direction. As the arm 146 rotates in the clockwise direction, it presses upon the valve 138 urging the valve 138 against the force of the spring 140 to close the channel 141, thus terminating passage of compressed air through the tube 36 into the channel 152 and the channel 154 and eventually past the valve 156. When this occurs, the supply of operating air from the supply through the controller 120 is terminated to the chamber 168 and the auxiliary pump 160 ceases to operate.

Thus, it can be seen that through the use of the air evacuating apparatus 100 of the present invention a liquid dispensing system 10 is shown which has the ability to eliminate excess air located within bag-in-box storage containers, thus reducing the possibility of air passing through the primary pumps 102 and into the dispensing tower 20, wherein the air, then mixed with carbonated water and syrup, would cause excessive foaming, with the undesirable result of either excess spillage or an abnormally short filling cycle.

It should be appreciated that although the present preferred embodiment contemplates the use of the air evacuating apparatus 100 of the present liquid dispensing system 10 when used in a vending machine, or counter application, it should be appreciated that the air evacuating apparatus 100 of the present invention can be used with liquid dispensers of various forms and constructions. It is the ability to sense the level of liquid in a reservoir and upon sensing the level of liquid in the reservoir to activate an auxiliary pump, which thereby operates to eliminate any excess and unwanted air in the reservoir, that is an important part of the subject matter of the present invention. Accordingly, although the present invention contemplates the use of the air evacuating apparatus of the present liquid dispensing system 10 for use in a soft drink dispensing application, it should be appreciated that it is usable in various other applications. It should also be appreciated that the primary pump 102 may be used with another auxiliary pump (not shown) to pump additional fluids in an integrated liquid dispensing system.

Thus, it will be obvious to those skilled in the art that various changes may be made to the liquid dispensing system described herein without departing from the spirit of the present invention, and therefore the invention is not limited to what is shown in the drawings and described in detail in the specification but only as indicated in the appended claims.

We claim:

1. A gas evacuating apparatus for use with a liquid dispensing system, the apparatus comprising:
   a primary pump,
   a reservoir,
   an inlet in said reservoir operative to introduce liquid into said reservoir,
   an outlet in said reservoir operative to transport liquid from said reservoir to said primary pump,
   a level sensor operative to ascertain the level of liquid in said reservoir,
   an auxiliary pump,
   means for providing fluid communication between said auxiliary pump and said reservoir,
   a controller responsive to output from said level sensor to selectively control operation of said auxiliary pump to remove gas from said reservoir.

2. The gas evacuating apparatus of claim 1 wherein said level sensor consists of a float in said reservoir.

3. The gas evacuating apparatus of claim 1 wherein said auxiliary pump includes a pumping chamber, an outlet channel extending between said pumping chamber to the atmosphere, said outlet channel including a one-way check valve, an inlet channel extending between said reservoir and said pumping chamber, said inlet channel providing for fluid communication between said reservoir and said pumping chamber, said inlet channel including a one-way check valve for one-way flow of gas from said reservoir to said pumping chamber.

4. The gas evacuating apparatus of claim 1, wherein said auxiliary pump is selectively operated through a primary pump control system operative to control said primary pump.

5. The gas evacuating apparatus of claim 1 wherein said controller includes an inlet valve which is selectively open upon movement of said float to selectively introduce compressed gas through a valve which is operative to control operation of said auxiliary pump.

6. A liquid dispensing system which includes a gas evacuating apparatus, the liquid dispensing system comprising:
   a liquid dispensing mechanism,
   a primary pump,
   a supply line operative to transport liquid from said primary pump to said dispensing mechanism
   an auxiliary pump,
   a reservoir,
   a liquid storage system,
   a supply line operative to transport liquid from said liquid storage system to said reservoir,
   a supply line operative to transport liquid from said reservoir to said primary pump,
   means for providing fluid communication between said reservoir and said auxiliary pump,
   a level sensor operative to sense the level of liquid in said reservoir,
   a controller,
   a compressed gas source,
   a compressed gas source supply line operative to transport compressed gas to said primary pump,
   said controller responsive to output from said level sensor for selectively controlling operation of said auxiliary pump for removing gas from said reservoir.

7. The liquid dispensing system of claim 6 wherein said level sensor consists of a float in said reservoir.

8. The liquid dispensing system of claim 6 wherein said auxiliary pump includes a pumping chamber, an outlet channel in said pumping chamber open to the atmosphere, said outlet channel including a check valve, an inlet channel extending between said reservoir and said pumping chamber, said inlet channel providing for fluid communication between said reservoir and said pumping chamber, said inlet channel including a check valve adapted for one-way flow of air from said reservoir to said pumping chamber.

9. The liquid dispensing system of claim 6 wherein said auxiliary pump is selectively operated from a primary pump control system.

10. The liquid dispensing system of claim 6 wherein said controller includes an inlet valve which is selectively open in response to movement of said float within said reservoir to selectively introduce compressed gas through a valve to occasion operation of said auxiliary pump.

11. A liquid dispensing system, including an air evacuating apparatus, the liquid dispensing system comprising:
    a primary pump,
    an auxiliary pump,
    a reservoir,
    a controller,
    means for introducing a supply of liquid into said reservoir,
    means for transporting a supply of liquid from said reservoir to said primary pump,
    means for sensing the level of liquid in said reservoir,
    a liquid storage system,
    a dispenser,
    means for providing fluid communication between said primary pump and said dispenser,
    means for providing fluid communication between said reservoir and said auxiliary pump,
    a compressed gas source,
    means for providing fluid communication between said compressed gas source and said primary pump and selectively to said auxiliary pump,
    said controller operative with said level sensor to selectively introduce compressed gas into said auxiliary pump in response to output from said level sensor, whereby said auxiliary pump is operated to remove gas from said reservoir.

12. The liquid dispensing system of claim 11 wherein said level sensor includes a float which is mechanically attached to an arm which is operative within said controller to selectively introduce compressed gas into said controller for controlling operation of said auxiliary pump.

13. The liquid dispensing system of claim 11 wherein said liquid dispensing system includes a plurality of liquid storage containers for introducing alternative liquids into the liquid dispensing system, each liquid storage container operative with a separate primary pump, reservoir, auxiliary pump, and associated fluid communication lines for removing gas from each reservoir.

14. A liquid dispensing system, which includes an air evacuating apparatus, the liquid dispensing system comprising:
    a dispensing tower,
    a compressed gas source,
    a source of carbonated water,
    means for transporting said carbonated water to said tower
    a primary pump,
    means for transporting liquid from said primary pump to said tower,
    a reservoir included with said primary pump,
    a level sensor including with said reservoir,
    a controller,
    an auxiliary pump, said auxiliary pump in fluid communication with said reservoir,
    a compressed gas supply line operative to transport compressed gas to said primary pump,
    a liquid storage system,
    a liquid storage supply line operative to transport liquid from said liquid storage system to said reservoir,
    said controller adapted to control operation of said auxiliary pump in response to output from said level sensor, whereby said auxiliary pump is operated to remove gas from said reservoir.

15. The liquid dispensing system of claim 14 wherein said liquid is syrup.

16. The liquid dispensing system of claim 14 wherein said compressed gas supply line provides for transportation of compressed gas to said controller.

17. The liquid dispensing system of claim 16 wherein said level sensor includes a float and a mechanical linkage between said float and an arm included within said controller, said arm operative to act upon a valve contained within said controller to introduce compressed gas into said controller for controlling operation of said auxiliary pump.

18. A liquid dispensing system, including an air evacuation apparatus, the liquid dispensing system operative to dispense carbonated liquids, such as soft drinks, the liquid dispensing system comprising:
    a dispensing tower,
    means for introducing a supply of carbonated water into said dispensing tower,
    means for introducing a supply of syrup into said dispensing tower,
    a primary pump,
    said syrup supply means extending between said primary pump and said dispensing tower,
    a compressed gas source,
    means for introducing a supply of compressed gas into said primary pump,
    a reservoir,
    a liquid supply,
    means for transporting liquid from said liquid supply into said reservoir,
    a level sensor,
    said level sensor operative to determine the level of liquid in said reservoir,
    a controller,
    an auxiliary pump,
    said controller operative to control operation of said auxiliary pump,
    said controller responsive to output from said level sensor to operate said auxiliary pump,
    means for providing fluid communication between said reservoir and said primary pump,
    means for providing fluid communication between said reservoir and said auxiliary pump whereby operation of said auxiliary pump will cause evacuation of gas contained in said reservoir.

* * * * *